Aug. 6, 1968   H. C. GARTNER   3,395,635
LAUTER TUB
Filed March 10, 1967   3 Sheets-Sheet 3
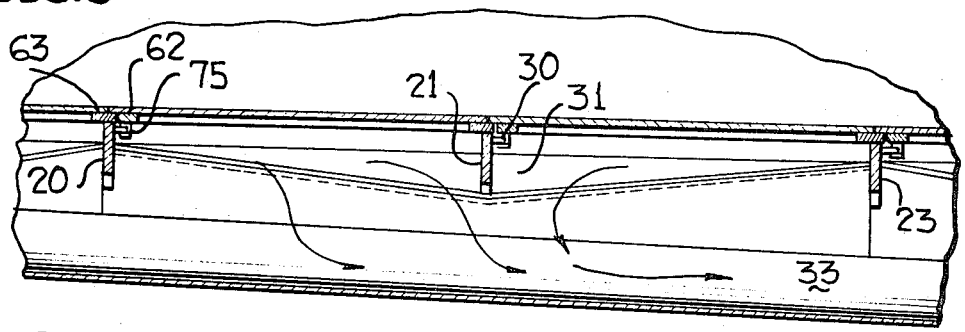
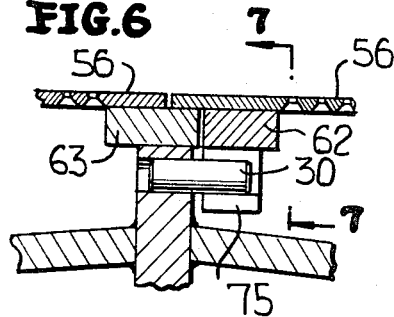
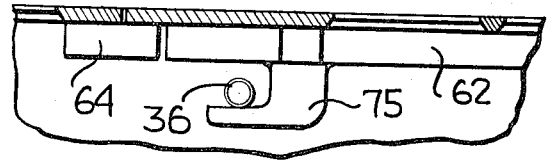
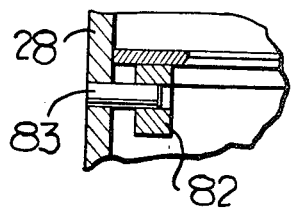
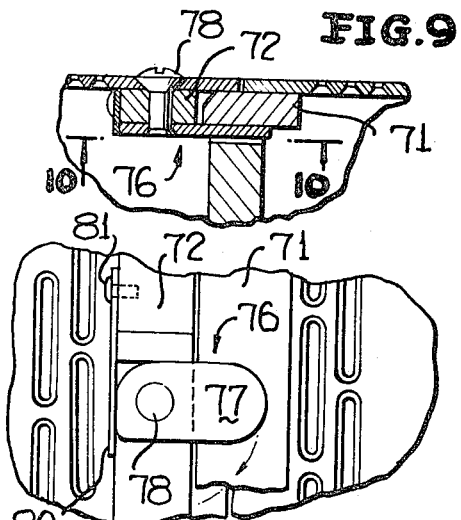
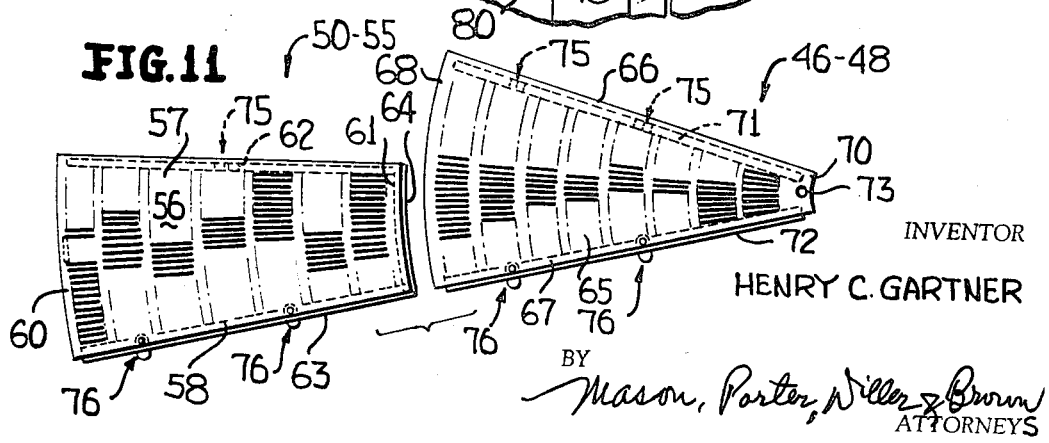
INVENTOR
HENRY C. GARTNER
BY Mason, Porter, Diller & Brown
ATTORNEYS United States Patent Office 3,395,635
Patented Aug. 6, 1968

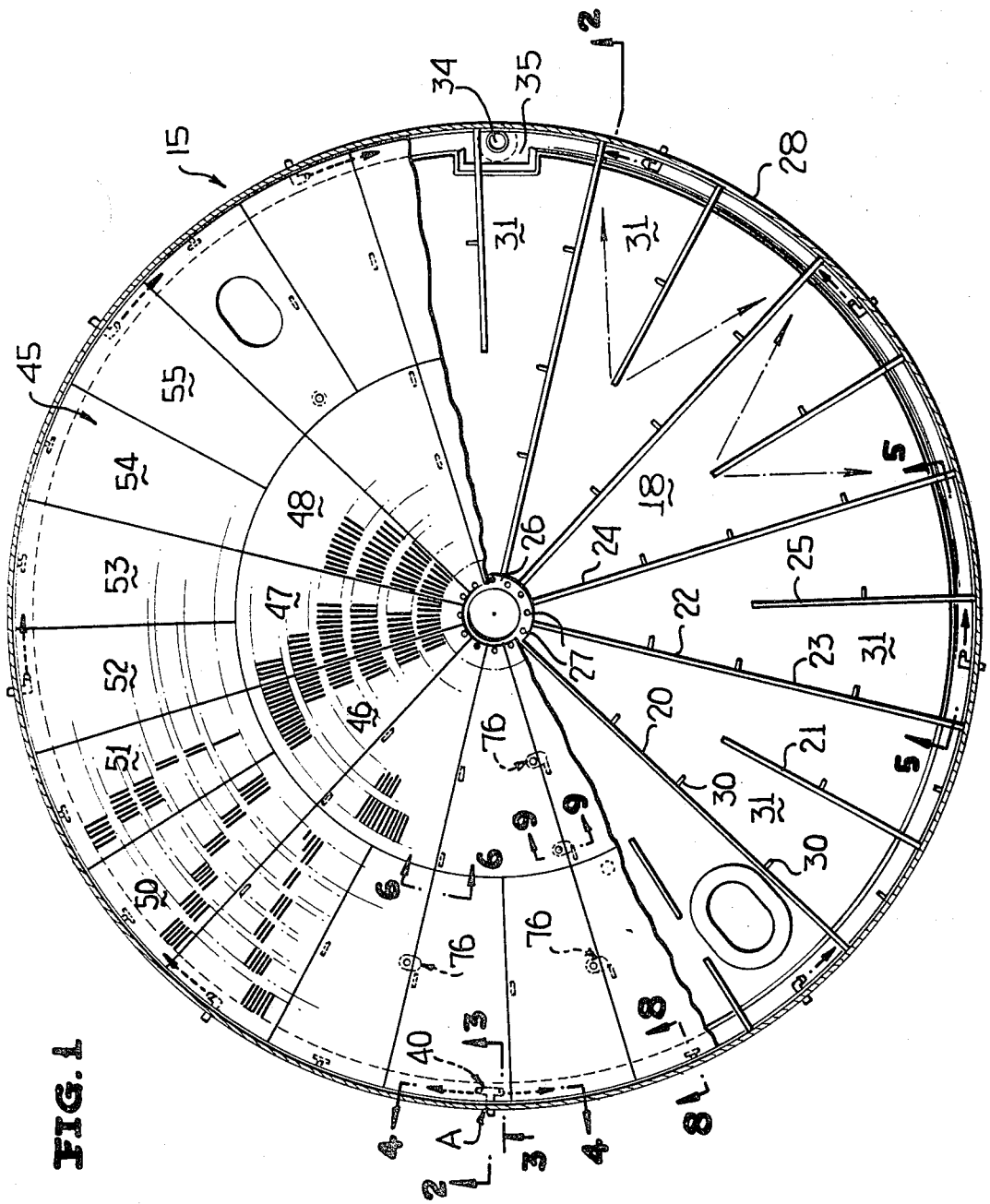

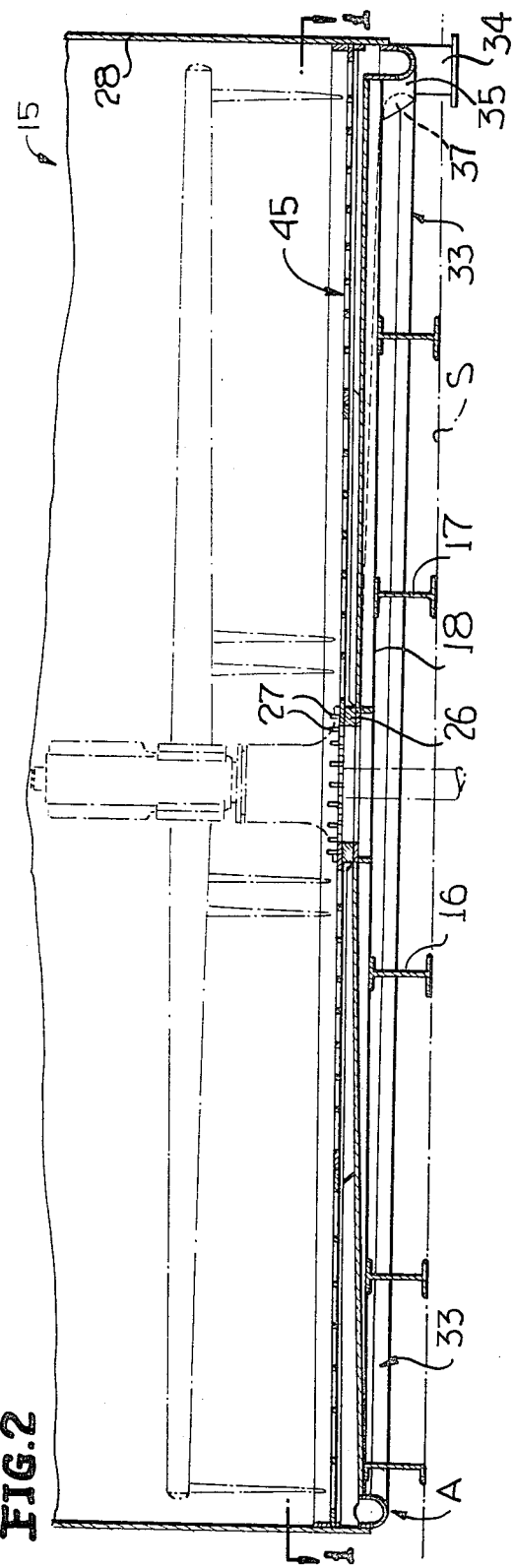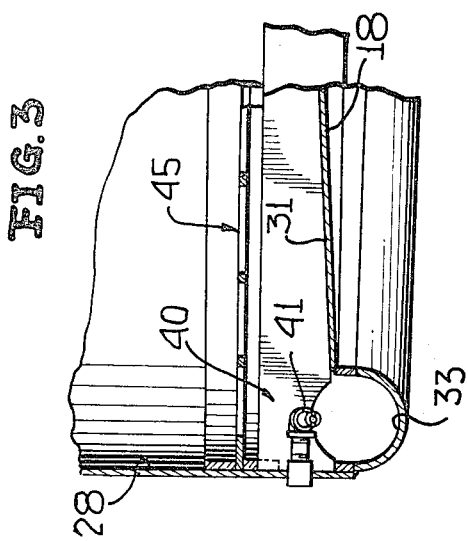

3,395,635
LAUTER TUB
Henry C. Gartner, Richboro, Pa., assignor to Acme Process Equipment Co., Oreland, Pa., a corporation of Pennsylvania
Filed Mar. 10, 1967, Ser. No. 622,138
14 Claims. (Cl. 99—275)

ABSTRACT OF THE DISCLOSURE

A lauter tub which facilitates the rapid and constant removal of the wort in a manner which reduces undesirable bacteria growth and foaming, and permits simplified flushing, cleaning and inspection. A bottom wall of the tube terminates at a peripheral trough which is inclined in clockwise and counter-clockwise directions as viewed in top plan from a point diametrically opposite a discharge opening toward the discharge opening. Nozzle means are disposed diametrically opposite the discharge opening for introducing water or cleaning solution in both directions, while a readily removable sectional false bottom facilitates the rapid inspection of the trough and reduces down time for inspection and/or repair.

---

This invention relates to a novel lauter tub, and is particularly directed to novel apparatus for removing wort or extract from the lauter tub which is subsequently delivered to kettles in which the brewing operation is continued.

In conventional lauter tubs the wort is drawn off by gravity through the mash which is supported on an apertured false bottom. After passing through the false bottom the wort enters a collection area into which open a plurality of underlet pipes of the type disclosed in Patent No. 2,758,030, in the name of Augusto Z. Metz, issued Aug. 7, 1956. The wort is thereafter delivered from the underlet pipes to a grant, the purpose of which is well-known, and the brewing operation is continued.

Collecting the wort from several points of the lauter tub bottom in this conventional manner has many disadvantages, primary among which are a decrease in the wort temperature which undesirably increases bacteria growth, excessive undesirable foaming at the grant, excessive closed piping which is subject to becoming clogged, and inefficient bottom-cleaning after each brew.

In keeping with the foregoing it is a primary object of this invention to overcome the above and other numerous disadvantages of conventional lauter tubs by providing a lauter tub having a peripheral trough which is inclined downwardly toward a discharge opening from a point diametrically opposite the discharge opening in both clockwise and counter-clockwise directions as viewed in top plan. With the sump and the discharge opening at the lowest portion of the trough a constant full stream flow of the wort to the grant is assured which keeps foaming at a minimum and, because of the concentrated flow of the wort in the trough, the wort temperature is maintained at a level which resists undesirable bacteria growth as is prevalent in wort which has been allowed to cool several degrees during the time detained being collected. Since the trough is completely open at all times clogging is completely avoided and since the sump is always flooded during normal operation, reliable operation of the level transmitter mounted in the sloping side of the sum is insured.

Still another object of this invention is to provide a novel lauter tub of the type heretofore described wherein a pair of nozzles or similar means are provided at the point diametrically opposite the discharge opening for directing water and/or cleaning solution into the trough in both directions toward the discharge opening. This built-in flushing system at all times insures a clean, free-flowing trough.

A further object of this invention is to provide a novel lauter tub constructed in accordance with the foregoing in which the bottom wall beneath the false bottom is provided with radially outwardly directed lands and valleys with the valleys sloping radially outwardly and downwardly toward the trough whereby the wort is collected in concentrated form in the valleys thereby conserving its heat as compared to conventional wort collection wherein the wort is spread in a thin film over a large bottom wall area.

Still another object of this invention is to provide a novel lauter tub of the type heretofore described wherein the false bottom is formed of a plurality of generally polygonally shaped sections each having opposite side edges, means are carried by one of the side edges for securement to an associated securing pin of the lauter tub, and releasable locking means are carried by the other of the side edges for releasably lockingly engaging associated slot means of the lauter tub whereby the sections can be rapidly removed and replaced during inspection, cleaning and/or repair.

With the above and other objects in view that will hereinafter appear, the nature of the invention will be more clearly understood by reference to the following detailed description, the appended claimed subject matter, and the several views illustrated in the accompanying drawings.

In the drawings:

FIGURE 1 is a sectional view with parts removed for clarity taken generally along line 1—1 of FIGURE 2, and illustrates a sectional false bottom, a bottom wall and a peripheral trough of the lauter tub.

FIGURE 2 is a fragmentary sectional view taken generally along line 2—2 of FIGURE 1, and illustrates the downward inclination of the trough toward a discharge opening from a point diametrically opposite thereto.

FIGURE 3 is an enlarged fragmentary sectional view taken generally along line 3—3 of FIGURE 1, and illustrates one of a pair of nozzles located diametrically opposite the discharge opening for directing fluid medium into the trough.

FIGURE 4 is an enlarged fragmentary sectional view taken generally along line 4—4 of FIGURE 1, and illustrates each of the nozzles and the manner in which the fluid media is directed into the trough in opposite directions.

FIGURE 5 is an enlarged fragmentary sectional view taken generally along line 5—5 of FIGURE 1, and illustrates one of a plurality of valleys for directing wort from the bottom wall to the trough.

FIGURE 6 is an enlarged sectional view taken generally along line 6—6 of FIGURE 1, and illustrates the manner in which one side of one of the false bottom sections is secured to a reinforcing rib of the bottom structure.

FIGURE 7 is a sectional view taken generally along line 7—7 of FIGURE 6, and more clearly illustrates the relationship of the elements thereof.

FIGURE 8 is an enlarged fragmentary sectional view taken generally along line 8—8 of FIGURE 1, and illustrates means for releasably securing an end edge of one of the false bottom sections to a body wall of the lauter tub.

FIGURE 9 is a sectional view taken generally along line 9—9 of FIGURE 1, and illustrates a pivotally mounted latch securing together adjacent side edges of a pair of false bottom sections.

FIGURE 10 is a fragmentary bottom view taken generally along line 10—10 of FIGURE 9, and more clearly illustrates the locked position of the latch.

FIGURE 11 is a top plan view of a pair of the false bottom sections, and illustrates ribs carried by each which effect overlapping engagement between the sections.

A novel lauter tub constructed in accordance with this invention is fully illustrated in the drawings, and is generally designated by the reference numeral 15. The lauter tub 15 is supported upon a framework (unnumbered) which may be formed, for example, by a plurality of beams 16, 17, etc., which are welded or otherwise secured to a bottom wall 18.

The bottom wall 18 of the lauter tub 15 includes a plurality of radiating long ribs 20, 22, 24, etc., and shorter radially radiating ribs 21, 23, 25, etc. The ribs 20, 22, 24, etc. are secured to a central upstanding flanged collar 26 having a plurality of axially upwardly directed pins 27. Opposite ends of the ribs 20 through 25 are welded or otherwise conventionally secured to an upstanding body wall 28 and each of the ribs includes one or more circumferentially directed pins, each being designated by the reference numeral 30.

Referring particularly to FIGURE 5 of the drawings, the bottom wall 18 is of a generally undulating configuration forming a valley 31 between each adjacent pair of the longer ribs. As is readily evident from FIGURE 5 of the drawings, the portion of the body wall forming the valley 31 between the ribs 21, 23 slopes downwardly from right-to-left while the other portion of the bottom wall between the ribs 20, 21 slopes downwardly from left-to-right. The wall portions of the body wall 18 defining each valley 31 also slope downwardly from the collar 26 toward a peripheral trough or channel 33. Thus, any wort or extract which impinges against the bottom wall 18 is directed by each of the valleys 31 in a continuously flowing stream into the trough 33 for subsequent discharge therefrom through a discharge opening 34 of a sump 35.

The trough 33 is secured by conventional means, such as welding, and suitable reinforcement to both the body wall 28 and the bottom wall 18, as is readily apparent in FIGURES 1 and 2 of the drawings. The trough 33 is of a generally U-shaped configuration in transverse section and slopes downwardly from left-to-right as viewed in FIGURE 2 or both clockwise and counter-clockwise as viewed in FIGURE 1 from a point A diametrically opposite the sump 35 and the discharge opening 34. That is, the point A is furthest from a horizontal supporting surface S while the point diametrically opposite thereto which includes the discharge opening 34 is closest to the surface S while all remaining points in either a clockwise or a counter-clockwise direction as viewed in FIGURE 1 progressively slope downwardly from point A to the discharge orifice 34. Thus, all wort discharged into the trough 33 between 0 and 180 degrees with the 0 point being the discharge orifice flows in a clockwise direction while all wort emptying into the trough between 180 and 360 degrees flows in a counter-clockwise direction. In this manner the trough has a concentrated flow which serves to maintain the wort temperature at a level which resists undesirable bacteria growth and insures that the sump 35 at the lowest portion of the trough is continually flooded which maintains foaming at a minimum. In addition, the termination of the trough 33 at the sump 35 has the added advantage that during normal operation the flooding of the wort insures the reliable performance of a level transmitter 37 (FIGURE 2) mounted in the sloping side of the sump 35.

Means generally designated by the reference numeral 40 are provided at point A for introducing water, cleaning solution or other fluid media from the exterior of the lauter tub 15 into the trough 33. As is best illustrated in FIGURES 3 and 4 of the drawings, the means 40 include a pair of nozzles 41, 42 which are provided with suitable valve means (not shown) for regulating both the volume and area of the spray issuing therefrom. The nozzles 41, 42 are connected by conventional conduits (unnumbered) to a suitable source (not shown) of fluid media depending, of course, upon the particular operation which is to be performed. For example, by the use of conventional pipes, couplings and valves the nozzles 41, 42 may first be coupled to a conventional water source for flushing the trough 33 after each brew and thereafter each nozzle may be connected to a source of cleaning solution during the cleaning cycle. This feature insures clean, free-flow of wort through the trough 33 and thereby precludes clogging and attended down time losses.

The lauter tub 15 is also provided with a so-called false bottom, generally designated by the reference numeral 45, which is formed of a plurality of substantially identical innermost section 46, 47, 48, etc., and a plurality of outer sections 50 through 55, etc. There are two outer sections associated with each inner section as, for example, the outer sections 50, 51 associated with the adjacent inner section 46 and forming a continuation thereof.

Each of the outer sections 50 through 55, etc. includes a grid 56 (FIGURE 11) provided with a plurality of identically contoured slots (unnumbered), the particular configuration of which is readily apparent from FIGURES 6, 7, 9 and 10 of the drawings. Each grid 56 is of a generally polygonal configuration and includes opposite side edges 57, 58 and end edges 60, 61. Ribs 62, 63 are welded to the respective edges 57, 58. The rib 63 projects laterally beyond the end edge 61.

Each of the innermost sections 46 through 48, etc., also includes a grid 65 of a generally polygonal or triangular configuration having a plurality of elongated slots (unnumbered) identical to the slots of the grids 56. Each grid 65 includes opposite side edges 66, 67 and end edges 66, 70. A rib 71 is welded beneath and inboard of the side edge 66 while a similar rib 72 is welded beneath but projects beyond the side edge 67. An aperture 73 is formed in the end edge 70 of each of the grids 65.

Due to the arrangement of the ribs 62 through 64, 71 and 72 the various sections 46 through 48, etc. and 50 through 55, etc., are positioned with opposing edges in overlapping relationship, as is readily apparent in FIGURES 6 and 9 of the drawings. In this manner the various sections impart a relatively smooth-surfaced contour to the false bottom 45 and form a rigid structure which, however, can be readily disassembled for inspecting the bottom wall 18 and/or the trough 33.

Each of the ribs 62, 71 includes at least one means in the form of a radially outwardly directed lug 75 (FIGURES 6, 7 and 11) for engaging beneath an associated one of the pins 30 in the manner clearly illustrated in FIGURES 6 and 7 of the drawings. In FIGURE 6 the rib 63 of the leftmost grid 56 rests upon one of the ribs (unnumbered) carrying a pin 30 while a portion of the rightmost grid 56 overlies the rib 63. A similar overlapping and locking is effected by the innermost sections 46 through 48 although in the case of the latter each of the ribs 66 carries a pair of lugs 75 which are in turn lockingly engaged or secured beneath an associated pair of the pins 30.

Releasable locking means generally designated by the reference numeral 76 are carried by the ribs 63, 72 of both the inner and outer sections 46, 47, 48, 50, 51, etc. The releasable locking means are arranged in pairs and each locking means includes a locking tongue 77 secured by an associated pivot 78 to each of the respective ribs 63, 72, as is best illustrated in FIGURES 9 and 10 of the drawings. In the illustrated latched position of FIGURES 9 and 10, the tongue 77 is in underlying relationship to the rib 71 of a righthandmost one of the sections and is maintained in this projected position by a spring 80 secured to the rib 72 by a fastener 81. Each tongue 77 is rotated with its longitudinal axis in alignment with an associated one of the rib 72 by rotating the fastener 78 causing the tongue to rotate in the direction of the headed arrow of FIGURE 10. A screwdriver or similar tool may be employed to rotate the fastener 78 and the tongue carried thereby. The ribs 20, 22, 24, etc., are preferably relieved or slotted to receive the tongue 77, in the manner clearly illustrated in FIGURES 9 and 10 of the drawings.

In addition to the means 75 and 76 for maintaining the various sections of the false bottom 45 in assembled relationship, the apertures 73 of each of the sections 46 through 48, etc., receives an associated one of the axially upwardly directed pins 27 while an apertured boss 82 welded to the underside of each of the grids 56 receives an associated pin 83 projecting radially inwardly from the body wall 28 (FIGURE 8). Each of the sections is thereby supported at each of its end edges as well as its side edges to form a relatively rigid yet rapidly assembled and disassembled false bottom.

While a preferred embodiment of the invention has been thus far described, it will be apparent to those skilled in the art that various modifications may be made in keeping with the spirit of this invention. For example, in lieu of the pair of nozzles 41, 42 a single nozzle may be employed directed generally downwardly toward the point A (FIGURE 4), and, if necessary, additional nozzles may be positioned about the periphery of the body wall 28 in the manner shown in FIGURE 1 of the drawings. The additional nozzles between 0 through 180 degrees would be directed clockwise while the opposite would be true of the nozzles between 180 and 360 degrees.

While preferred forms and arrangement of parts have been shown in illustrating the invention, it is to be clearly understood that various changes in details and arrangement of parts may be made without departing from the spirit and scope of the invention as defined in the appended claimed subject matter.

I claim:
1. A bottom structure particularly adapted for use as a false bottom of a lauter tub comprising a plurality of generally polygonally shaped sections each having opposite side edges, means carried by one of said side edges for securement to an associated securing pin of a lauter tub, and releasable locking means carried by the other of said side edges for releasably lockingly engaging associated slot means of a lauter tub.

2. The bottom structure as defined in claim 1 wherein at least one of said sections includes a rib secured beneath and projecting beyond one of said side edges, and a side edge of an adjacent section is in overlapping relationship with said rib.

3. The bottom structure as defined in claim 1 wherein said sections include opposite end edges, at least one of said sections includes a rib secured beneath and projecting beyond one of said end edges, and an end edge of an adjacent section is in overlapping relationship with said rib.

4. The bottom structure as defined in claim 1 wherein said sections include opposite end edges, and an end adge of each section includes means for securing said sections to a lauter tub.

5. The bottom structure as defined in claim 1 wherein said releasable locking means is a pivotally mounted latch.

6. A lauter tube comprising a bottom wall joined to an upstanding body wall at a peripheral juncture, a trough at said juncture, a discharge opening in said trough through which liquid is adapted to flow outwardly of said trough, said trough being inclined downwardly relative to the horizontal from a point remote from said discharge opening toward said discharge opening whereby liquid in said trough between said point and the discharge opening is rapidly delivered to the discharge opening, and said trough being inclined downwardly from said point toward said discharge opening in both clockwise and counterclockwise directions as viewed in top plan.

7. The lauter tub as defined in claim 6 wherein said point is diametrically opposite said discharge opening, and means are provided for introducing a fluid medium from the exterior of the tube into the trough at said point.

8. The lauter tub as defined in claim 7 including another wall disposed above said bottom wall defining a false bottom of the tub, and said other wall being provided with a plurality of elongated radially directed slots through which the liquid is adapted to pass incident to the discharge thereof through the discharge opening.

9. The lauter tub as defined in claim 6 wherein said point is diametrically opposite said discharge opening, and nozzle means are provided for introducing a fluid medium from the exterior of the tub into the trough at said point and directing the fluid medium in both of said directions.

10. The lauter tube as defined in claim 6 wherein said bottom wall includes a plurality of radially directed lands and valleys, and said valleys slope downwardly radially outwardly toward said trough.

11. The lauter tube as defined in claim 10 including another wall disposed above said bottom wall defining a false bottom of the tub, and said other wall is provided with a plurality of elongated radially directed slots through which the liquid is adapted to pass incident to the discharge thereof through the discharge opening.

12. A lauter tub comprising a bottom wall joined to an upstanding body wall at a peripheral juncture, a trough at said juncture, a discharge opening in said trough through which liquid is adapted to flow outwardly of said trough, said trough being inclined downwardly relative to the horizontal from a point remote from said discharge opening toward said discharge opening whereby liquid in said trough between said point and a discharge opening is rapidly delivered to the discharge opening, and means for introducing a fluid medium from the exterior of the tub into the trough at said point.

13. The lauter tub as defined in claim 12 wherein said bottom wall includes a plurality of radially directed lands and valleys, and said valleys slope downwardly radially outwardly toward said trough.

14. A lauter tub comprising a bottom wall joined to an upstanding body wall at a peripheral juncture, a trough at said juncture, a discharge opening in said trough through which liquid is adapted to flow outwardly of said trough, said trough being inclined downwardly relative to the horizontal from a point remote from said discharge opening toward said discharge opening whereby liquid in said trough between said point and the discharge opening is rapidly delivered to the discharge opening, another wall disposed above said bottom wall defining a false bottom of the tub, and said another wall being provided with a plurality of elongated radially directed slots through which the liquid is adapted to pass incident to the discharge thereof through the discharge opening.

References Cited
UNITED STATES PATENTS

| | | |
|---|---|---|
| D. 143,128 | 12/1945 | Butler. |
| 1,805,287 | 5/1931 | Krantz. |
| 2,758,030 | 8/1956 | Metz _____ 99—278 X |
| 2,948,661 | 8/1960 | O'Neill _____ 99—278 X |
| 2,961,316 | 11/1960 | Cook et al. _____ 99—276 X |

ROBERT W. JENKINS, *Primary Examiner.*